United States Patent
O'Connor et al.

(10) Patent No.: US 7,472,390 B2
(45) Date of Patent: Dec. 30, 2008

(54) METHOD AND APPARATUS TO ENABLE EXECUTION OF A THREAD IN A MULTI-THREADED COMPUTER SYSTEM

(75) Inventors: Dennis M. O'Connor, Chandler, AZ (US); Michael W. Morrow, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 804 days.

(21) Appl. No.: 10/677,913

(22) Filed: Oct. 1, 2003

(65) Prior Publication Data

US 2005/0097552 A1 May 5, 2005

(51) Int. Cl.
G06F 9/46 (2006.01)
(52) U.S. Cl. ...................... 718/104; 712/225
(58) Field of Classification Search ................ 718/104; 712/225
See application file for complete search history.

(56) References Cited

U.S. PATENT DOCUMENTS

| | | | | |
|---|---|---|---|---|
| 4,891,753 A | * | 1/1990 | Budde et al. | 712/217 |
| 5,968,167 A | * | 10/1999 | Whittaker et al. | 712/225 |
| 6,009,452 A | * | 12/1999 | Horvitz | 718/102 |
| 6,694,425 B1 | | 2/2004 | Eickemeyer | |
| 2002/0156999 A1 | | 10/2002 | Eickemeyer et al. | |
| 2004/0036622 A1 | * | 2/2004 | Dukach et al. | 340/691.6 |

FOREIGN PATENT DOCUMENTS

EP 0947926 A2 10/1999

* cited by examiner

*Primary Examiner*—Li B Zhen
*Assistant Examiner*—Mengyao Zhe
(74) *Attorney, Agent, or Firm*—Blakely, Sokoloff, Taylor & Zafman LLP

(57) ABSTRACT

Briefly, in accordance with an embodiment of the invention, an apparatus and method to enable execution of a thread in a multi-threaded computer system is provided. The method may include enabling execution of a non-executing thread based at least on whether a hardware resource is or will be available to an instruction of the non-executing thread. The apparatus may include a thread dispatch circuit to enable execution of a pending thread based at least on whether a hardware resource is or will be available to an instruction of the non-executing thread.

21 Claims, 4 Drawing Sheets

METHOD AND APPARATUS TO ENABLE EXECUTION OF A THREAD IN A MULTI-THREADED COMPUTER SYSTEM

BACKGROUND

Multi-threading may allow high-throughput computer architectures. A thread may refer to a set of instructions that may be executed by a processor.

At different points in time, one thread may be executing and another thread may be pending, and thread switching may refer to switching between executing a currently running thread to executing a pending thread.

Threads that are currently being executed by a processor may be referred to as executing threads, running threads, or active threads. Threads that are not currently being executed by a processor may be referred to as pending threads, inactive threads, non-executing threads, or non-running threads.

System performance may be varied based on the thread switching algorithm used in a particular system. System designers are continually searching for alternate ways to provide thread switching in a multi-threaded computer system.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

Figure 1:
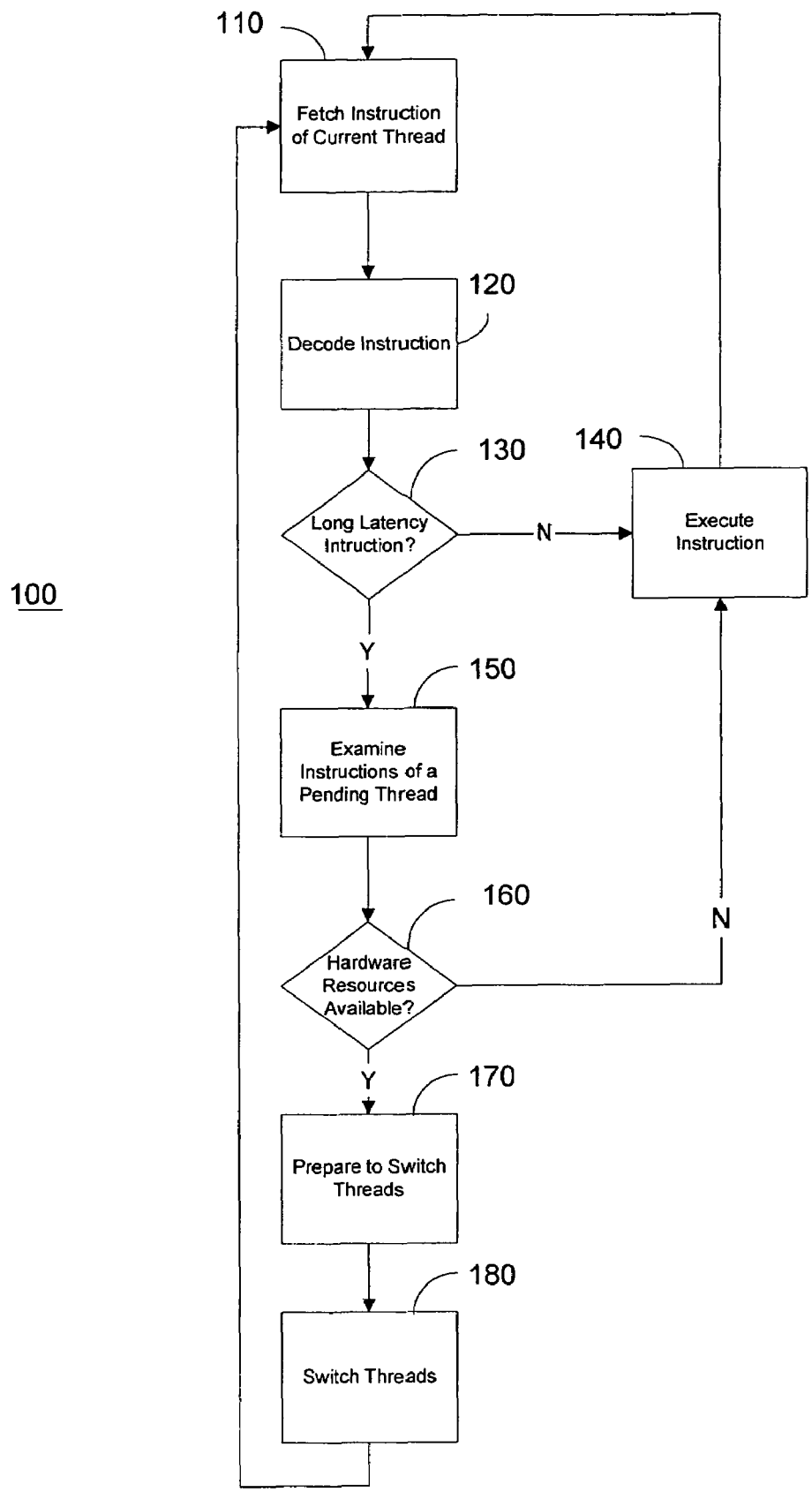
FIG. 1 is a flow diagram illustrating a method to provide thread switching in a multi-threaded computer system in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

In the following description and claims, the terms "include" and "comprise," along with their derivatives, may be used, and are intended to be treated as synonyms for each other. In addition, in the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 is a flow diagram illustrating a method 100 to provide thread switching in a multi-threaded computer system in accordance with one embodiment of the present invention.

In a multi-threaded processor (not shown), multiple threads of one or more programs may be executed either simultaneously or at different points in time. For example, one thread may be executed by the processor and another thread may be pending, i.e., waiting to be executed at a later point in time. In another example, one set of threads may be executed simultaneously and another set of threads may be pending.

In a multi-threaded processor, logic may be included in the processor to decide when to issue instructions from threads that are available. For example, one thread may run until some predetermined condition occurs and then the processor may switch to run another thread. Switching between the execution of threads may be referred to as thread switching.

Method 100 of FIG. 1 may begin with fetching an instruction of a currently executing thread (block 110). The instruction may be decoded (block 120). After decoding, it may be determined whether a predetermined condition has been met. For example, it may be determined whether the instruction of the executing thread may cause a long latency (diamond 130).

While the predetermined conditions may vary in different embodiments, an instruction that may require a long latency prior to execution may be considered to be a predetermined condition. The term "long latency" may mean a time period between receipt of an instruction and execution of the instruction that causes the processor to suffer one or more stalls. Stalls may refer to cycles in which part or all of the processor pipeline does not execute an instruction.

Thus a long latency period may be several cycles or may be hundreds of cycles, depending on the ability of the processor to perform other instructions in the latency period. For example, a load instruction that requires the obtaining of information from system memory (e.g., as on a cache miss) may require hundreds of cycles, while a load instruction that obtains data from a cache (such as a level 1 (L1) cache) closely associated with the processor may require fewer than ten cycles. In certain embodiments, both load instructions may be considered long latency instructions, as a processor may suffer stall cycles before data is ready for processing.

The predetermined conditions may be selected based on a knowledge that the conditions may, but need not necessarily, cause a latency that leads to pipeline stalls.

Although the scope of the present invention is not limited in this respect, other examples of instructions that may be considered to be a predetermined condition may include store instructions and certain arithmetic instructions. For example, a floating point divide operation may be a predetermined condition. In addition, other operations which access a memory subsystem may be a predetermined condition.

When a predetermined condition is detected, instructions of another thread, e.g., a pending thread, may be fetched and executed so that few or no stall cycles occur. Thus in certain embodiments, performance may be significantly increased in multi-thread contexts.

If it is determined that the instruction may not have a long latency (i.e., a predetermined condition has not occurred), the instruction may be executed (block 140) and a next instruction of the current thread may be fetched (block 110).

If it is determined that a long latency may result, (i.e., a predetermined condition has occurred), then the instructions of a pending thread may be examined (block 150). The examining of the pending thread may occur during executing of the long latency instruction of the currently executing thread. Next, it may be determined which hardware resources are associated with the instructions of the pending thread.

The method may next comprise determining whether one or more hardware resources are or will be available to use by the instructions of the pending thread (diamond 160). For example, it may be determined whether a register, a queue, a buffer, a functional unit (e.g., multiplier), an input/output (I/O) device, or a memory sub-system will be available to the instructions of the non-executing thread.

If no hardware resources will be available to the pending thread, then execution may continue for the current executing thread (block 140). If one or more hardware resources will be available for use by the instructions of the pending thread, then the processor may be prepared to switch threads (block 170). In one embodiment, preparation to switch threads may include executing a remaining one or several instructions of the current thread prior to the thread switch. In such manner, additional instructions may be performed without a processor stall. Additionally, because such instructions are already present in the processor pipeline, they need not be flushed. Thus instructions of a currently executing thread may continue to be processed while the second thread is prepared for execution.

Next, the threads may be switched (block 180). That is, the processor may switch from running the currently executing thread to running the pending thread if one or more hardware resources are available, or will be available to the pending thread.

While FIG. 1 discusses a method for processing a long latency instruction, as discussed above it is to be appreciated that the flow of FIG. 1 may be applicable to other predetermined conditions.

As is discussed above, the embodiment of FIG. 1 illustrates a method to decide when to switch between two threads. This method may use two different thread-switching criteria: one based on properties of the currently executing thread, and another based on the properties of threads that are not currently executing. This can be expressed in terms of transitioning threads from the running to the pending state and back again.

In one embodiment of the invention, a running thread becomes a pending thread when it issues a particular kind of instruction, for instance, one that does not return a result for a long time, i.e., long latency instruction, and also whenever a pending thread has no "scoreboarded" resource. A scoreboarded resource may refer to a resource that is not available for use until some pending operation completes. For example, a register may be scoreboarded and therefore unavailable for use to an instruction of a pending thread.

A thread that has no resources scoreboarded may be able to issue at least one instruction, so switching to a pending thread with no scoreboarded resources may not decrease the efficiency of the processor compared to other thread switching methods. For example, a timer or counter may be used to limit the amount of time an executing thread can run without being switched. However, using counters or timers may decrease the overall efficiency of the system since several clock cycles may pass before the counter times out.

Figure 2:
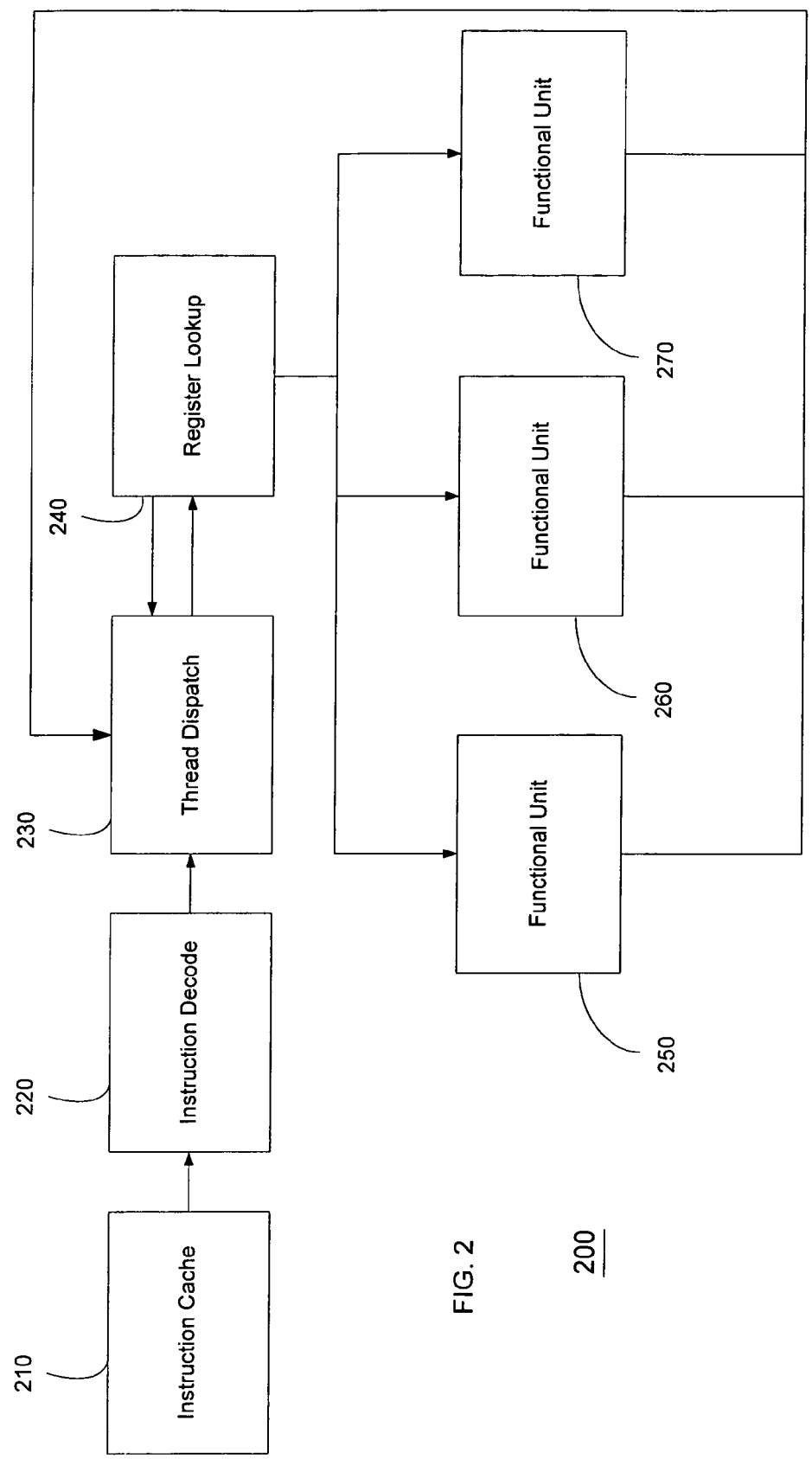
FIG. 2 is a block diagram illustrating a processor pipeline in accordance with an embodiment of the present invention.

Turning to FIG. 2, shown is a block diagram illustrating a processor pipeline 200 in accordance with an embodiment of the present invention. Processor pipeline 200 includes an instruction cache 210, an instruction decoder 220, a thread dispatch 230, and a register lookup 240. In addition, processor pipeline 200 may include functional units 250, 260, and 270. Processor pipeline may be included in a multi-threaded processor, and may be adapted to process multiple threads of one or more software programs.

While the type of processor which includes a pipeline in accordance with an embodiment of the present invention may vary, in one embodiment the processor may be a relatively simple in-order processor. In one embodiment, the processor may have a reduced instruction set computing (RISC) architecture, such as an architecture based on an Advanced RISC Machines (ARM) architecture. For example, in one embodiment a 32-bit version of an INTEL® XSCALE™ processor available from Intel Corporation, Santa Clara, Calif. may be used. However, in other embodiments the processor may be a different processor.

In one embodiment, instruction cache 210 may be coupled to receive instructions from a bus interface unit of the processor (not shown). Instruction cache 210 may be used to store instructions, including instructions of multiple threads. Instruction cache 210 may be coupled to provide instructions to instruction decoder 220.

Instruction decoder 220 may decode instructions by breaking more complex instructions into smaller instructions that may be processed faster. For example, in one embodiment instructions may be decoded into micro-operations (uops). However, in other embodiments other types of instructions may be decoded, such as macro operations or another form of instruction. Additionally, it is to be understood that various instruction sets may be used, such as Reduced Instruction Set Computing (RISC) instructions or Complex Instruction Set Computing (CISC) instructions. Further, in one embodiment instruction decoder 220 may decode CISC instructions to RISC instructions.

Still referring to FIG. 2, decoded instructions, including an identification of registers to be accessed, may be provided to thread dispatch 230.

Thread dispatch 230 may include circuitry or logic to enable execution of a pending thread based at least on whether one or more hardware resources, such as, e.g., functional units 250-270, are available, or will be available to one or more instructions of the non-executing thread. In one embodiment, thread dispatch 230 may serve as a scheduler that chooses which of the pending thread(s) may issue instructions according to which hardware resources are available, and may do this every clock cycle. In addition, in some embodiments, thread dispatch 230 may enable execution of a thread if the requisite registers from block 240 contain, or will contain, the needed values for the instruction. The techniques described herein for enabling execution of a thread may be used in simultaneous multi-threading (SMT) systems or time division multi-threading (TDM) systems. In one example, an SMT system may refer to a system that can issue some number of instructions from different threads simultaneously. Thread dispatch 230 may be referred to as a scheduler, thread dispatch circuit or a thread dispatch device.

Register lookup 240 may be used to provide a physical register identification of a register in a register file unit. In such manner, registers may be assigned to each instruction.

Functional units 250, 260 and 270 may be adapted to execute instructions and may also be referred to as execution units. In some embodiments, functional units may be adapted to perform arithmetic and logic operations or to execute load and store instructions. In various embodiments, functional units 250, 260, and 270 may be multipliers, adders, dividers, integer arithmetic logic units (ALU), floating point arithmetic logic units (ALU), registers, load/store units, memory management units (MMU), multimedia accelerators, security and cryptographic coprocessors, other specialized coprocessors (including coprocessors external to the processor), etc.

Pipeline processor 200 may be adapted to implement some or all of the operations of method 100 of FIG. 1. For example, instruction decoder 220 may include circuitry to perform the operations 110 and 120 of method 100; thread dispatch 230 may include circuitry to perform operations 130, 150, 160, 170, and 180 of method 100, and functional units 250-270 may include circuitry to perform operation 140 of method 100.

As discussed above, thread dispatch 230 may be adapted to enable execution of one or more pending threads based at least on whether one or more hardware resources will be available to the pending threads. In one embodiment, thread dispatch 230 may be adapted to examine instructions of multiple threads to determine which threads are executed and which threads remain in a pending state. Thread dispatch 230 may be adapted to determine which hardware resources, e.g., functional units, are associated with the instructions of the multiple threads. Further, thread dispatch 230 may be coupled to functional units 250-270 to determine if functional units 250-270 are available, or will be available to the instructions of a pending thread. In one embodiment, thread dispatch 230 may be coupled to receive "ready" signals from functional units 250-270 and register lookup 240, wherein the ready signals indicate whether or not the functional units are available or unavailable.

In another embodiment, thread dispatch 230 may be adapted to switch execution from a running thread to the pending thread. Thread dispatch 230 may be adapted to examine instructions of the running thread to determine if a predetermined condition occurs. For example, thread dispatch 230 may include logic to examine instructions of the running thread to determine if a long latency instruction occurs.

Although the scope of the present invention is not limited in this respect, in one embodiment, thread dispatch 230 may include a lookup table that includes a list of predetermined conditions. In this manner, when an instruction is received by thread dispatch 230, it may be analyzed against entries in the lookup table to determine whether the instruction corresponds to one of the predetermined conditions. Alternately, logic in thread dispatch 230 may be used to detect the presence or occurrence of a predetermined condition. In still other embodiments, microcode in thread dispatch 230 may determine the presence or occurrence of a predetermined condition.

If a predetermined condition is detected by examining a running thread, then, examination of pending threads and the availability of hardware resources associated with the pending threads may be performed by thread dispatch 230. In one embodiment, thread dispatch 230 may switch execution from a first executing thread to execution of a first pending thread based at least on the number and type of hardware resources unavailable to the first pending thread.

In another embodiment, thread dispatch 230 may compare the hardware resources available to two pending threads, e.g., thread A and thread B. Thread dispatch 230 may determine the number of hardware resources available to threads A and B, and then may switch from executing a running thread to executing thread A if the number of unavailable hardware resources to thread A is less than the number of unavailable hardware resources to thread B. Or simply, thread dispatch 230 may enable execution of thread A if the number of unavailable hardware resources to thread A is less than the number of unavailable hardware resources to thread B.

As discussed, in some embodiments a thread switching system is provided that enables, or basis the selection of, the execution of a pending thread based at least, in whole or part, on the number and type of hardware resources unavailable to that pending thread or other pending threads, and possibly taking into account the unavailable resources needed by other pending threads. In one example, the present invention provides a method and apparatus to enable threads based on what could be happening, i.e., examining the non-running threads and enabling execution of a thread based on the availability of hardware resources to the non-running threads.

Figure 3:
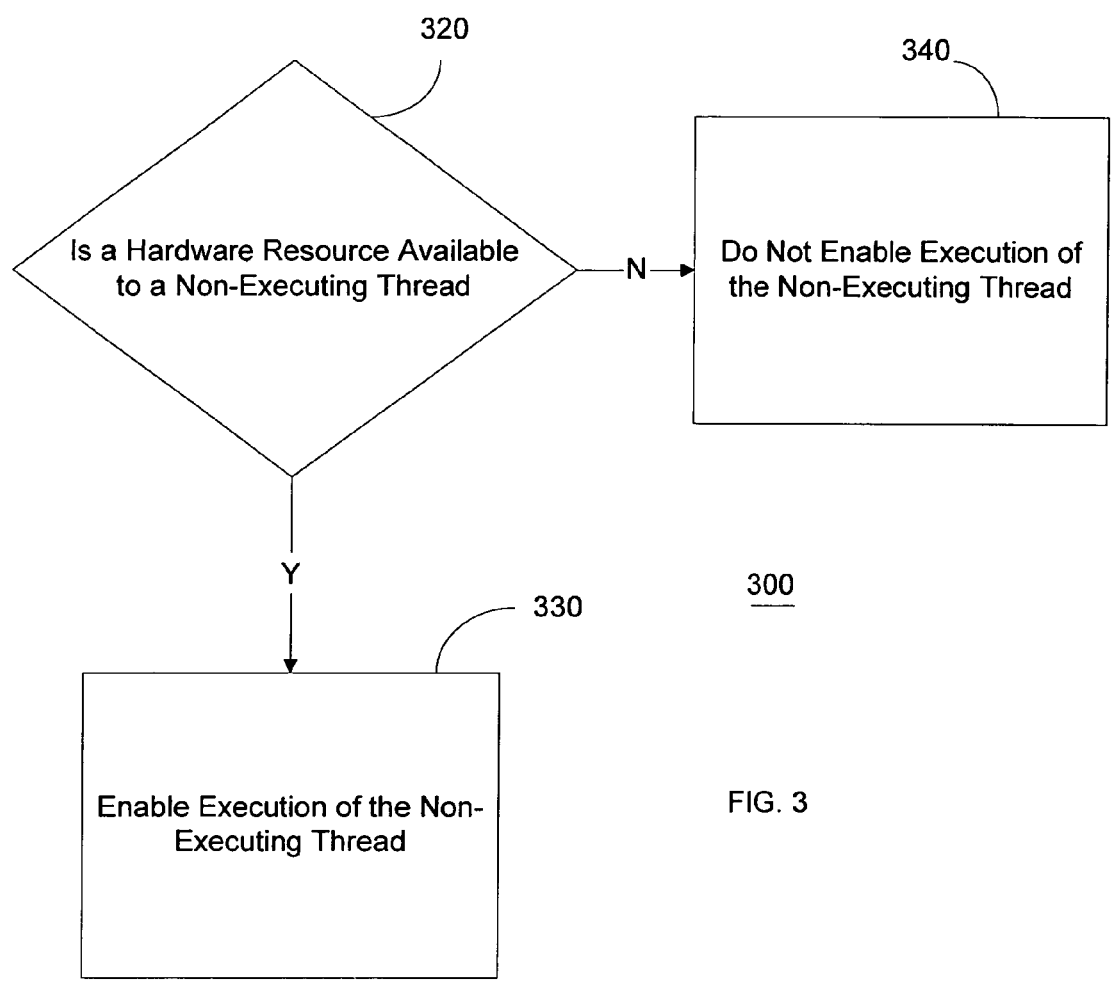
FIG. 3 is a flow diagram illustrating a method to enable execution of a non-executing thread in accordance with an embodiment of the present invention.

Turning to FIG. 3, shown is a flow diagram illustrating a method 300 to enable execution of a non-executing thread in accordance with an embodiment of the present invention. In one embodiment, a non-executing thread may be enabled based at least on whether a hardware resource is available, or will be available to an instruction of the non-executing thread. Although the scope of the present invention is not limited in this respect, a hardware resource may be a register, a queue, a buffer, a functional unit, an input/output (I/O) device, or a memory sub-system. In one embodiment, execution of a non-executing thread may be based on whether a hardware resource such as, for example, a register, is scoreboarded.

Method 300 may include determining whether a hardware resource is available to an instruction of the non-executing thread (block 320). The operation of determining may include examining an instruction stream of the non-executing thread; identifying an instruction in the instruction stream; and identifying hardware resources associated with the instruction. If it is determined that the hardware resource is available to the instruction of the non-executing thread, then execution of the non-executing thread may be enabled (block 330). In other words, the non-executing thread may be selected for execution. Otherwise, execution of the non-executing thread may not be enabled if the hardware resource is unavailable to the instruction of the non-executing thread (block 340).

In another embodiment, a processor may switch from executing at least two running threads to executing at least two pending threads if hardware resources are available to the at least two pending threads.

Figure 4:
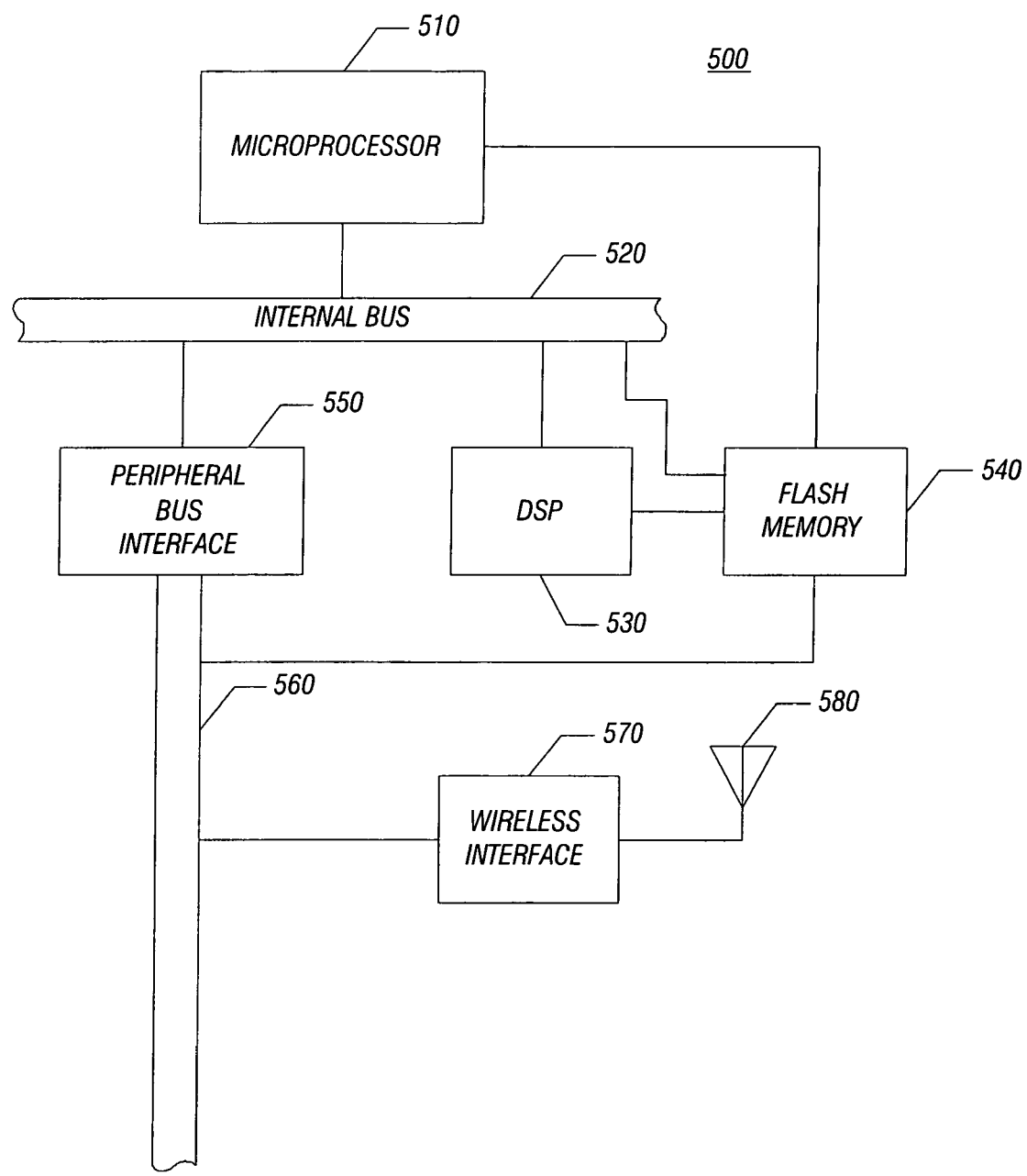
FIG. 4 is a block diagram illustrating a portion of a wireless device in accordance with an embodiment of the present invention.

Turning to FIG. 4, shown is a block diagram of a wireless device with which embodiments of the invention may be used. As shown in FIG. 4, in one embodiment wireless device 500 includes a processor 510, which may include a general-purpose or special-purpose processor such as a microprocessor, microcontroller, application specific integrated circuit (ASIC), a programmable gate array (PGA), and the like.

In one embodiment, processor 500 may include processor pipeline 200 as discussed above with reference to FIG. 2 In addition, in various embodiments, processor 500 may be adapted to implement method 100 (FIG. 1) or method 300 (FIG. 3) discussed above.

Wireless device 500 may be a personal digital assistant (PDA), a laptop or portable computer with wireless capability, a web tablet, a wireless telephone (e.g., cordless or cellular phone), a pager, an instant messaging device, a digital music player, a digital camera, or other devices that may be adapted to transmit and/or receive information wirelessly. Wireless device 500 may be used in any of the following systems: a wireless personal area network (WPAN) system, a wireless local area network (WLAN) system, a wireless metropolitan area network (WMAN) system, or a wireless wide area network (WWAN) system such as, for example, a cellular system.

An example of a WLAN system includes a system substantially based on an Industrial Electrical and Electronics Engineers (IEEE) 802.11 standard. An example of a WMAN system includes a system substantially based on an Industrial Electrical and Electronics Engineers (IEEE) 802.16 standard. An example of a WPAN system includes a system substantially based on the Bluetooth™ standard (Bluetooth is a registered trademark of the Bluetooth Special Interest Group). Another example of a WPAN system includes a system substantially based on an Industrial Electrical and Electronics Engineers (IEEE) 802.15 standard such as, for example, the IEEE 802.15.3a specification using ultrawideband (UWB) technology.

Examples of cellular systems include: Code Division Multiple Access (CDMA) cellular radiotelephone communication systems, Global System for Mobile Communications (GSM) cellular radiotelephone systems, Enhanced data for GSM Evolution (EDGE) systems, North American Digital Cellular (NADC) cellular radiotelephone systems, Time Division Multiple Access (TDMA) systems, Extended-TDMA (E-TDMA) cellular radiotelephone systems, GPRS, third generation (3G) systems like Wide-band CDMA (WCDMA), CDMA-2000, Universal Mobile Telecommunications System (UMTS), or the like.

As shown in FIG. 4, processor 510 may be coupled to a digital signal processor (DSP) 530 via an internal bus 520. In turn, DSP 530 may be coupled to a flash memory 540. As further shown in FIG. 4, flash memory 540 may also be coupled to microprocessor 510, internal bus 520, and peripheral bus 560.

Processor 510 may also be coupled to a peripheral bus interface 550 and a peripheral bus 560. While many devices may be coupled to peripheral bus 560, shown in FIG. 4 is a wireless interface 570 which is in turn coupled to an antenna 580. In various embodiments, antenna 580 may be a dipole antenna, helical antenna or another antenna adapted to wirelessly communicate information. Wireless interface 570 may be a wireless transceiver.

Although the description makes reference to specific components of device 500, it is contemplated that numerous modifications and variations of the described and illustrated embodiments may be possible.

Although processor pipeline 200 is illustrated as being used in a wireless device in one embodiment, this is not a limitation of the present invention. In alternate embodiments processor pipeline 200 may be used in non-wireless devices such as, for example, a server, a desktop, or an embedded device not adapted to wirelessly communicate information.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
examining an instruction stream of a non-executing thread during execution of an executing thread;
identifying an instruction in the instruction stream;
identifying hardware resources associated with the instruction;
determining whether the hardware resource is available to the instruction of the non-executing thread; and
switching from execution of a thread executing an instruction with long or potentially long latency to execution of the non-executing thread if the hardware resource is or will be available to the instruction of the non-executing thread.

2. The method of claim 1, further comprising switching from the execution of an executing thread to the execution of the non-executing thread if the hardware resource is or will be available to the instruction of the non-executing thread.

3. The method of claim 1, wherein enabling comprises enabling execution of the non-executing thread based on whether the hardware resource is scoreboarded.

4. The method of claim 1, wherein enabling comprises enabling execution of the non-executing thread based on whether a register, a queue, a buffer, a functional unit, an input/output (I/O) device, or a memory sub-system device is or will be available to the instruction of the non-executing thread.

5. The method of claim 1, further comprising:
not enabling execution of the non-executing thread if the hardware resource is unavailable to the instruction of the non-executing thread.

6. The method of claim 1, further comprising enabling execution of a second non-executing tread if the hardware resource is available to the instruction of the non-executing thread.

7. The method of claim 1, further comprising switching from executing at least two executing threads to executing the non-executing thread and at least one other non-executing thread if the hardware resource is available to the instruction of the non-executing thread.

8. A method, comprising:
determining a number of hardware resources unavailable to pending threads while executing a first executing thread, wherein the hardware resource is a functional unit adapted to perform arithmetic and logic operations or to execute load and store instructions; and
switching from the first executing thread to a first pending thread if the number of unavailable hardware resources to the first pending thread is less than the number of unavailable hardware resources to a second pending thread.

9. The method of claim 8 further comprising determining the number of hardware resources unavailable to a second pending thread.

10. An article comprising a storage medium having stored thereon instructions, that, when executed by a computing platform, result in:
examining an instruction stream of a non-executing thread during execution of an executing thread;
identifying an instruction in the instruction stream;
identifying hardware resources associated with the instruction;
determining whether the hardware resource is available to the instruction of the non-executing thread; and
switching from execution of a thread executing an instruction with long or potentially long latency to execution of the non-executing thread if the hardware resource is or will be available to the instruction of the non-executing thread.

11. An apparatus, comprising:
a hardware resource operating as a functional unit to perform arithmetic and logic operations or to execute load and store instructions; and
a thread dispatch circuit to determine a number of hardware resources unavailable to pending threads while executing a first executing thread and switching from the first executing thread to a first pending thread if the number of unavailable hardware resources to the first pending thread is less than the number of unavailable hardware resources to a second pending thread.

12. The apparatus of claim 11, wherein the thread dispatch circuit is adapted to examine instructions of multiple threads to determine which threads are executed and which threads remain in a pending state.

13. The apparatus of claim 11, wherein the hardware resource is a functional unit adapted to perform arithmetic and logic operations or to execute load and store instructions.

14. The apparatus of claim 11, wherein the hardware resource is a multiplier, adder, a divider, an integer arithmetic logic unit (ALU), a floating point arithmetic logic unit (ALU), a register, a load/store unit, a memory management unit (MMU), a multimedia accelerator, a security coprocessor, or a cryptographic coprocessor.

15. The apparatus of claim 11, wherein the thread dispatch circuit is adapted to determine which hardware resources are associated with the instructions of multiple threads and to determine if the hardware resources are available to the instructions of the multiple treads.

16. The apparatus of claim 11, further comprising: an instruction cache to store instructions of multiple threads; an instruction decoder coupled to the thread dispatch; and a register lookup to provide a physical register identification of a register in a register file unit and assign registers to each instruction.

17. The apparatus of claim 11, wherein the thread dispatch circuit is adapted to switch execution from a running thread to the pending thread.

18. The apparatus of claim 17, wherein the thread dispatch circuit is adapted to examine instructions of the running thread to determine if a predetermined condition occurs.

19. The apparatus of claim 17, wherein the thread dispatch circuit is adapted to examine instructions of the running thread to determine if a long latency instruction occurs.

20. A system, comprising:
an antenna;
a processor coupled to the antenna, wherein the processor comprises:
a hardware resource operating as a functional unit to perform arithmetic and logic operations or to execute load and store instructions; and
a thread dispatch circuit to determine a number of hardware resources unavailable to pending threads while executing a first executing thread and switching from the first executing thread to a first pending thread if the number of unavailable hardware resources to the first pending thread is less than the number of unavailable hardware resources to a second pending thread.

21. The system of claim 20, wherein the system comprises a wireless phone, wherein the wireless phone comprises: the antenna; and the processor coupled to the antenna.

* * * * *